United States Patent
Aihara

(10) Patent No.: US 9,667,857 B2
(45) Date of Patent: May 30, 2017

(54) IMAGING APPARATUS WITH ADJUSTABLE NOISE LEVEL REDUCTION

(71) Applicant: Panasonic Intellectual Property Management Co., Ltd., Osaka (JP)

(72) Inventor: Masayuki Aihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/878,009

(22) Filed: Oct. 8, 2015

(65) Prior Publication Data
US 2016/0104473 A1    Apr. 14, 2016

(30) Foreign Application Priority Data

Oct. 9, 2014 (JP) .................................. 2014-207917
Sep. 9, 2015 (JP) .................................. 2015-177279

(51) Int. Cl.
| | | |
|---|---|---|
| H04N 5/225 | (2006.01) | |
| H04N 5/232 | (2006.01) | |
| G10K 11/34 | (2006.01) | |
| G10L 21/0264 | (2013.01) | |
| H04R 3/00 | (2006.01) | |

(52) U.S. Cl.
CPC ....... *H04N 5/23212* (2013.01); *G10K 11/341* (2013.01); *G10L 21/0264* (2013.01); *H04R 3/005* (2013.01); *H04N 5/232* (2013.01); *H04R 2410/05* (2013.01); *H04R 2499/11* (2013.01)

(58) Field of Classification Search
CPC  G10K 11/341; G10L 21/0264; H04N 5/2254; H04N 5/23212
See application file for complete search history.

(56) References Cited

U.S. PATENT DOCUMENTS

| | | | | |
|---|---|---|---|---|
| 5,319,165 A | * | 6/1994 | Geddes | ................... F01N 1/065 |
| | | | | 181/206 |
| 7,110,035 B1 | * | 9/2006 | Hellstrand | ............. G02B 7/365 |
| | | | | 250/201.2 |
| 2011/0022403 A1 | * | 1/2011 | Washisu | .................. H04N 5/60 |
| | | | | 704/503 |
| 2011/0063461 A1 | * | 3/2011 | Masuda | ............. H04N 5/23203 |
| | | | | 348/208.11 |
| 2013/0230189 A1 | * | 9/2013 | Kimura | .................. G03B 31/00 |
| | | | | 381/94.1 |

(Continued)

FOREIGN PATENT DOCUMENTS

| | | |
|---|---|---|
| JP | 2002-344787 | 11/2002 |
| JP | 2007-311850 | 11/2007 |
| JP | 2010-226142 | 10/2010 |

*Primary Examiner* — Amy Hsu
(74) *Attorney, Agent, or Firm* — Wenderoth, Lind & Ponack, L.L.P.

(57) ABSTRACT

Provided is an imaging apparatus that performs sound processing suitable for each type of AF operation according to a lens f-number so that recorded sound is clear and contains little noise. The imaging apparatus includes a lens, a microphone for recording sound, and a filter configured to reduce noise contained in an output signal of the microphone. The noise reduction level of the filter is controlled according to the lens f-number so that the noise reduction level of the filter is increased when the lens f-number is large than when the lens f-number is small.

2 Claims, 8 Drawing Sheets

(56) References Cited

U.S. PATENT DOCUMENTS

2014/0192239 A1\* 7/2014 Ajito .................. H04N 5/243
                                                    348/252
2015/0358542 A1\* 12/2015 Sato .................. H04N 5/265
                                                    348/239

\* cited by examiner

IMAGING APPARATUS WITH ADJUSTABLE NOISE LEVEL REDUCTION

BACKGROUND OF THE INVENTION

1. Field of the Invention

The present disclosure relates to an imaging apparatus.

2. Description of the Related Art

A digital camera, one type of present-day imaging apparatus, is mounted with a liquid crystal display monitor on a rear side of a main body. Immediately after an image is shot, the image can be seen on the liquid crystal display monitor, which is very convenient for a photographer. There are many types of digital cameras that can shoot not only still images, but also moving images, which attests to enhanced performance of digital cameras. Some digital cameras are of a lens-interchangeable type, in general referred to as a digital single-lens reflex type, and digital cameras of this type are increasing. By selecting a lens suitable for a shooting purpose, the shot image quality has been enhanced.

In the above-described situation, however, lens operations during moving-image shooting—e.g., a zooming operation, an AF operation (autofocusing operation), an iris operation (diaphragm adjusting operation), and an optical camera shake correction operation—cause a vibration and noise. Since the sound of the vibration and noise is recorded at a high level, the video image played back is likely to be barely appreciable. An effect of lens operation noise reduction processing is very important for a digital camera with a moving-image shooting feature.

Lens operation noise reduction processing is disclosed in Unexamined Japanese Patent Publication No. 2002-344787. In the method of this conventional art, as lens operation noise reduction processing, a microphone for detecting a vibration caused by a lens operation is provided in addition to a microphone for recording sound so that the antiphase of a signal detected by the former microphone is cancelled from an output signal of the latter microphone. In another method of Unexamined Japanese Patent Publication No. 2002-344787, lens operation noise reduction processing is performed using the aforementioned cancellation technique only during a zooming operation of the lens so as to mitigate an adverse effect, such as distortion of recorded data during normal time.

Unexamined Japanese Patent Publication No. 2007-311850 discloses a directivity synthesis method using output signals of a plurality of non-directivity microphones. In this method, output signals are synthesized with sound signals generated by delaying the output signals so that the synthesized sound signals have left and right stereo directivity (high stereo separation level).

Unexamined Japanese Patent Publication No. 2007-311850 discloses another method for reducing a noise effect. In this method, when a noise effect is significant at a low sound input level, the synthesis ratio is controlled to reduce the stereo separation level in order to reduce the noise effect.

Unexamined Japanese Patent Publication No. 2010-226142 discloses a method for integrating, in an interchangeable-type lens, data on a lens-specific noise processing algorithm.

However, the conventional imaging apparatus has the following problems:

A typical imaging apparatus continuously performs an AF operation during moving-image shooting, but the operating distance and speed of a focus lens change depending on the lens f-number. At a small lens f-number, the focal depth is small. In order to focus, the operating distance of a focus lens is small, and the operating speed is not high. Conversely, at a large lens f-number, the focal depth is large. In order to focus, the operating distance of a focus lens is large, and the operating speed is high. As a result, noise caused by a lens AF operation is greater at a large lens f-number than at a small lens f-number.

For lens operation noise reduction processing, there exist conventional imaging apparatuses having a noise processing algorithm compatible with different lens types, including an interchangeable type. However, changes in the AF operation noise level depending on the lens f-number have not been addressed. Noise reduction processing specific to the lens f-number has not been achieved.

A noise frequency peak is often lens-unique at different f-numbers while the lens performs an AF operation. Noise reduction processing by, e.g., a notch filter, is uniform processing that does not enable sound processing specific to different f-numbers. For instance, when sound processing is performed assuming that noise is generated at a small lens f-number and a video image is shot at a large lens f-number, the video image played back is barely appreciable due to a high noise level. Conversely, when sound processing is performed assuming that noise is generated at a large lens f-number and a video image is shot at a small lens f-number, the sound quality of the video image played back is deteriorated due to sound over-suppression.

According to the present disclosure, there is provided an imaging apparatus that can record a clear video image at a low noise level even when the lens f-number is variable.

An imaging apparatus of the present disclosure includes a lens, a microphone for recording sound, and a filter configured to reduce noise contained in an output signal of the microphone. The noise reduction level of the filter is controlled according to the lens f-number so that the noise reduction level of the filter is increased when the lens f-number is large than when the lens f-number is small.

According to the present disclosure, there is provided an imaging apparatus that can record a clear video image at a low noise level by performing sound processing specific to AF lens noise generated by an AF operation that changes depending on the lens f-number.

DETAILED DESCRIPTION OF THE PREFERRED EMBODIMENT

First Exemplary Embodiment

Figure 1:
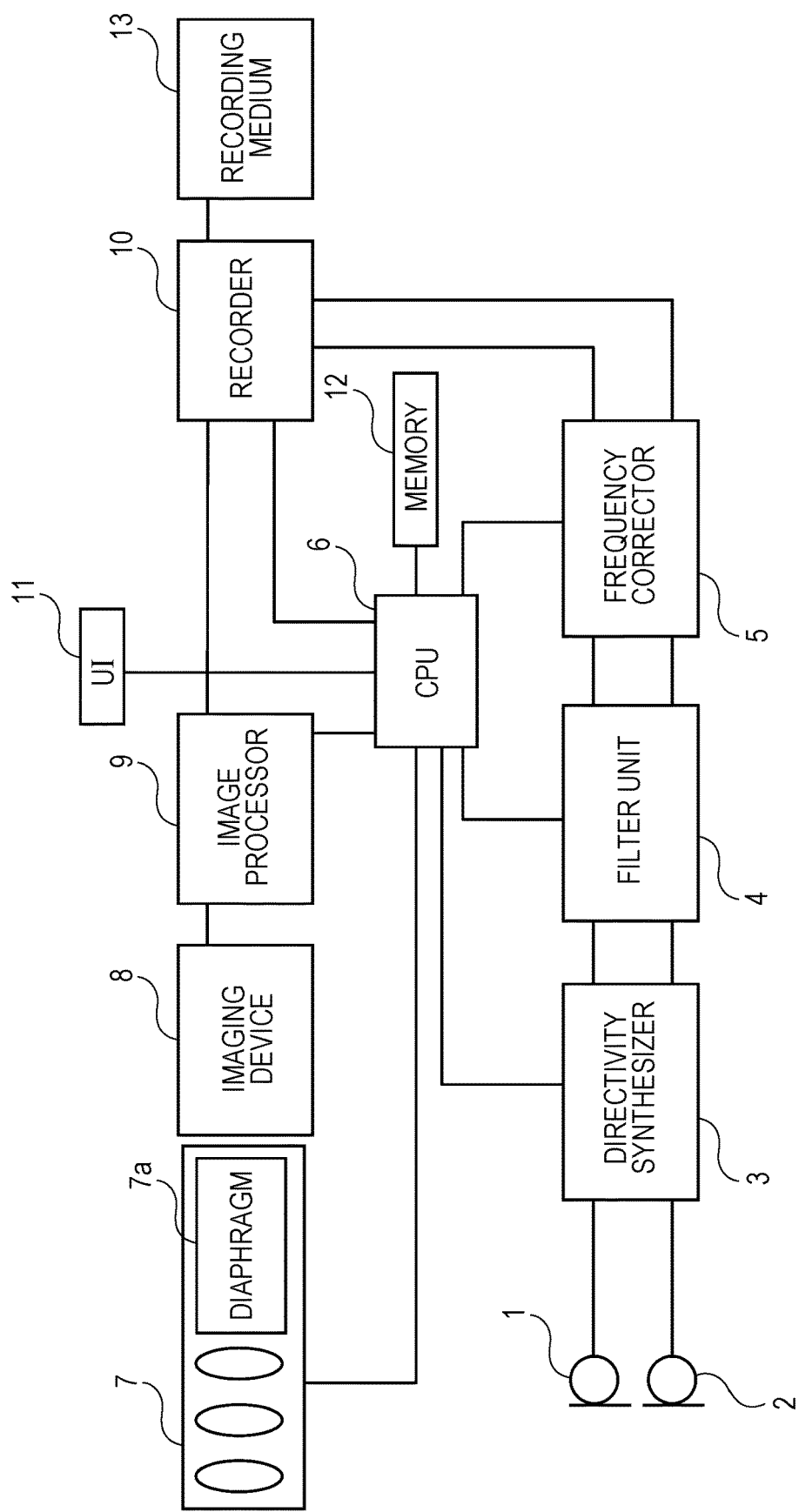
FIG. 1 is a diagram illustrating a configuration of an imaging apparatus according to a first exemplary embodiment.
Figure 2:
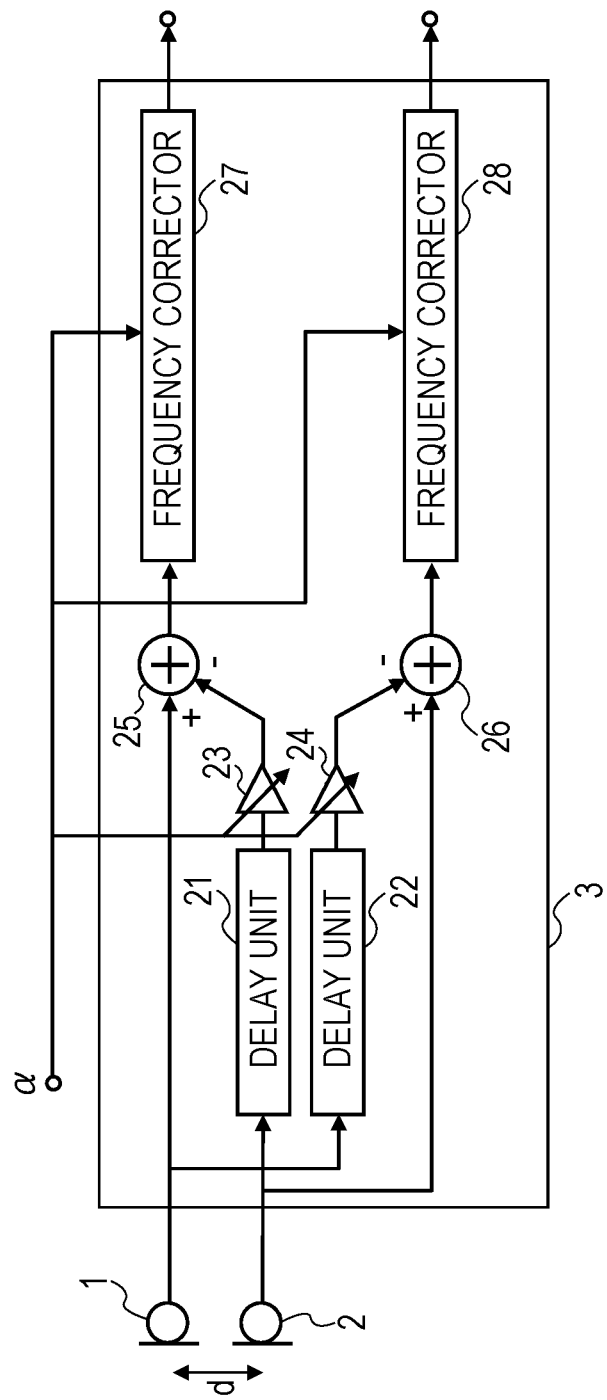
FIG. 2 is a diagram illustrating a configuration of a directivity synthesizer of the imaging apparatus according to the first exemplary embodiment.

A first exemplary embodiment is hereinbelow described with reference to the drawings. FIG. 1 is a diagram illustrating a configuration of an imaging apparatus according to the first exemplary embodiment. FIG. 2 is a diagram illustrating a configuration of a directivity synthesizer according to the first exemplary embodiment. FIGS. 3 to 6 are diagrams illustrating a shooting operation by the imaging apparatus according to the first exemplary embodiment.

In FIG. 1, a sound signal is output from non-directivity microphones for recording sound (hereinafter referred to as "microphones") 1, 2. Sound processing is performed for the sound signal by directivity synthesizer 3, filter unit 4, and frequency corrector 5, and the processed signal is input into recorder 10. Via lens 7, an image signal formed on imaging device 8 is converted into an RGB electric signal which is in turn output to image processor 9. In image processor 9, YC processing, gamma processing, and JPEG compression processing are performed for the signal so that the signal is output to recorder 10 as a moving image signal.

Under control by CPU 6, recorder 10 synchronizes the input moving image and sound signals with respect to time and records the synchronized signal in recording medium 13 as a moving image signal containing sound.

To CPU 6, image processor 9 outputs data on the brightness of each portion of an image and data on a high-frequency component of an illuminance signal. CPU 6 computes an iris control signal from the brightness data of each portion of the image, computes an AF control signal from the data on the high-frequency component of the illuminance signal, and outputs the control signals to lens 7. According to the iris control signal and AF control signal input from CPU 6, lens 7 performs an iris adjustment operation and an AF adjustment operation.

Via user interface (hereinafter referred to as "UI") 11, a user performs zooming and lens diaphragm operations. Zooming operation control and lens diaphragm operation control signals are input from UI 11 to CPU 6. After CPU 6 performs speed adjustment processing for the zooming operation, the signals are output to lens 7.

According to the zooming operation control signal from CPU 6, lens 7 performs a zooming adjusting operation. According to the lens diaphragm operation control signal, diaphragm 7a of lens 7 performs a diaphragm adjustment operation.

Sound processing is performed for a sound signal output from microphones 1, 2 by directivity synthesizer 3, filter unit 4, and frequency corrector 5, and adjustment is made to the aforementioned sound processing by each of these components under control of CPU 6. These operations are hereinbelow described with reference to FIG. 2.

Figure 3:
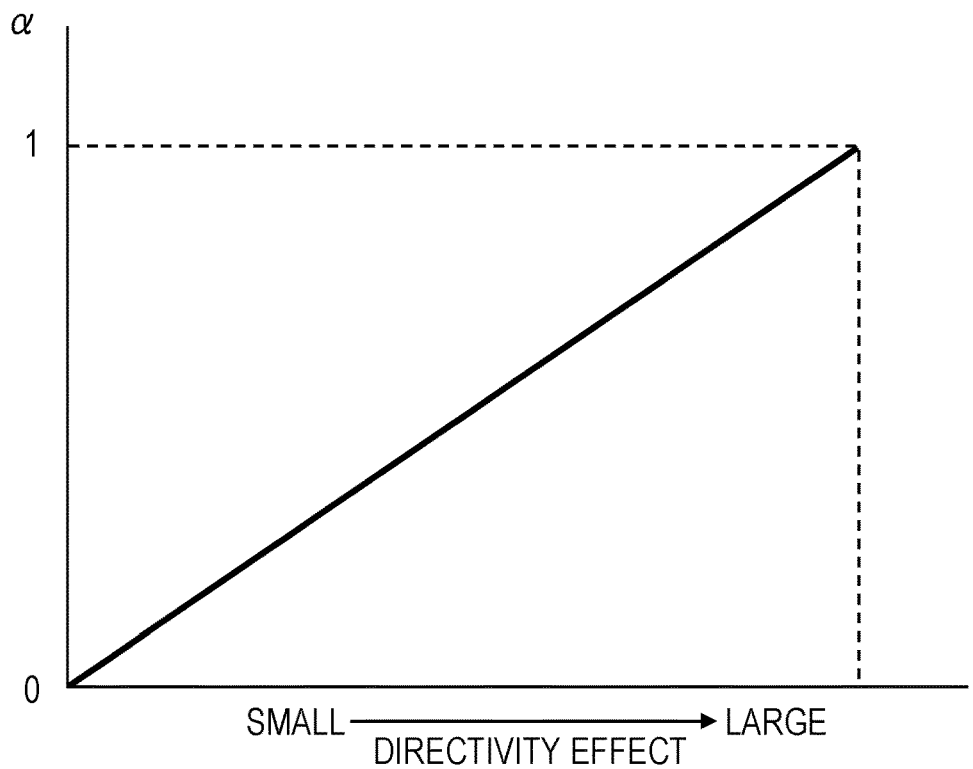
FIG. 3 is a diagram illustrating an operation of the directivity synthesizer of the imaging apparatus according to the first exemplary embodiment.

FIG. 2 is a diagram illustrating the configuration of microphones 1, 2 and directivity synthesizer 3. Microphones 1, 2 are disposed so as to be separated by distance d therebetween. Delay units 21, 22 in directivity synthesizer 3 address a time delay of a sound wave travelling distance d through the air. Sound signals from microphones 1, 2 for recording sound are respectively input into adders 25, 26 and delayed by delay units 21, 22. The signals are multiplied by control parameter α from CPU 6 by multipliers 23, 24, and subtraction is performed for the signals by adders 25, 26. As illustrated in FIG. 3, the value of control parameter α from CPU 6 ranges from 0 to 1.

Figure 4:
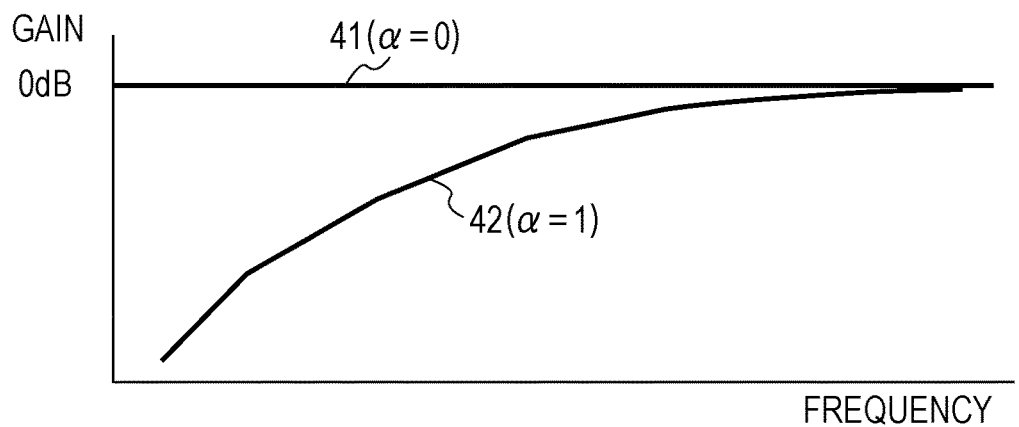
FIG. 4 is a diagram illustrating an operation of the directivity synthesizer of the imaging apparatus according to the first exemplary embodiment.

When α=0, the outputs of multipliers 23, 24 are 0, the outputs of microphones 1, 2 are output as-is from adders 25, 26. The frequency characteristic is frequency characteristic 41, as illustrated in FIG. 4. When α=1, the gain is small at low bandwidths where phase differences are small since the signal of one of the microphones is decreased. The frequency characteristic is frequency characteristic 42, as illustrated in FIG. 4.

Figure 5:
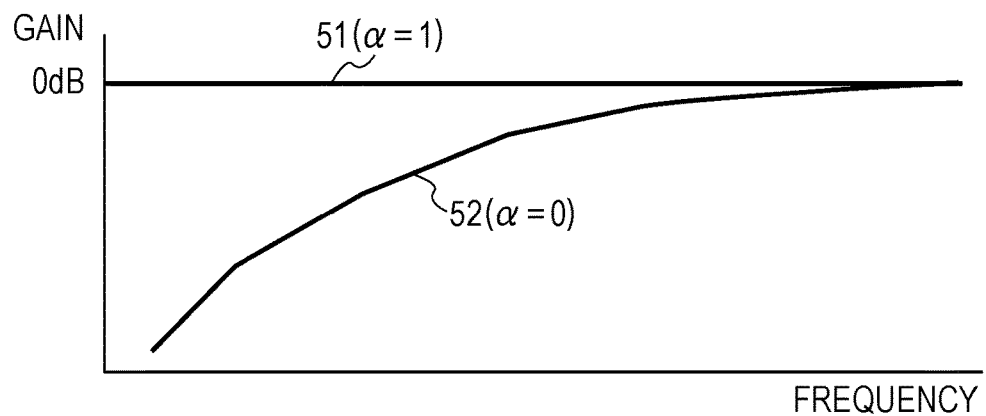
FIG. 5 is a diagram illustrating an operation of the directivity synthesizer of the imaging apparatus according to the first exemplary embodiment.

As can be seen in frequency characteristics 51, 52 of FIG. 5, filter processing performed by frequency correctors 27, 28 produces frequency characteristics that are opposite of the frequency characteristics of FIG. 4. Even when control parameter α varies in the range from 0 to 1, frequency characteristics of the outputs from frequency correctors 27, 28 are constant, and no tonal change occurs.

The operation of directivity synthesizer 3 is hereinbelow described. When control parameter α is 1, sound coming from the direction of microphone 2 to microphone 1 is processed as follows: After a sound wave is detected by microphone 2 as a sound signal, the sound wave travels distance d through the air. With a delay of the time taken for this travel, the sound wave is detected by microphone 1 as a sound signal and is input into adder 25. The signal detected by microphone 2 is routed through delay unit 21 and, via multiplier 23, input into adder 25, where subtraction is performed for the signal. In an ideal state, the sound is completely cancelled from the output from adder 25.

Figure 6:
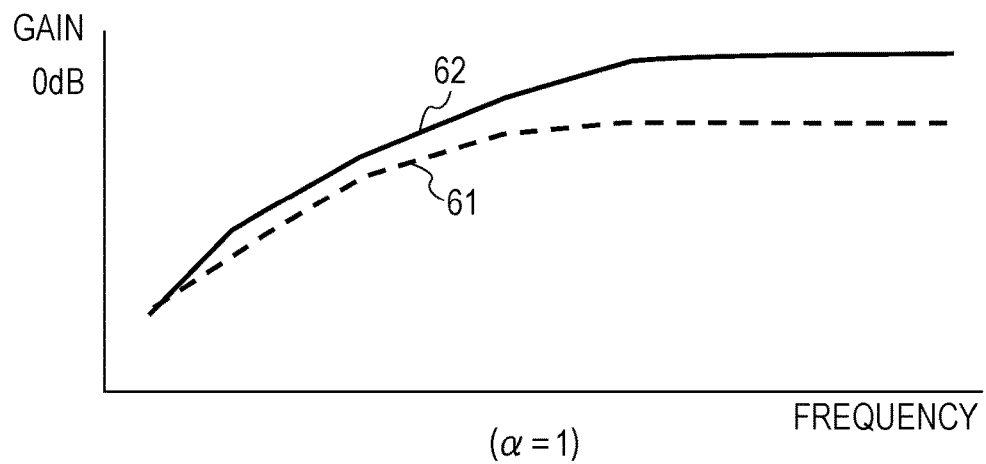
FIG. 6 is a diagram illustrating an operation of the directivity synthesizer of the imaging apparatus according to the first exemplary embodiment.

A signal detected by microphone 2 is input into adder 26, and a signal detected by microphone 1 with a time delay is routed through delay unit 22 and, via multiplier 24, input into adder 26. These signals do not completely cancel each other due to the time delay in signal detection and the time difference caused by the delay unit. FIG. 6 illustrates output frequency characteristics of adder 25 and adder 26. In FIG. 6, the output frequency characteristics of adder 25 and adder 26 are denoted by reference numerals 61, 62, respectively. In the entire frequency bandwidth range, the gain of frequency characteristic 61 is lower than the gain of frequency characteristic 62, which indicates that the output of adder 25 is smaller. The sound from the direction of microphone 2 that is output from adder 26 is louder and has directivity.

When α=0, both of microphones 1, 2 are non-directive. The signals of the microphones are output as-is from adders 25, 26. Without regard to the sound direction, the gain is constant, and there is no directivity. By controlling control parameter α from CPU 6 in FIG. 1 so that the value of control parameter α ranges from 0 to 1, the directivity level (low-high) (stereo separation effect level (low-high)) can be controlled. As illustrated in FIG. 5, since the gain due to frequency correction is greater when α=1 than when α=0, noise components tend to increase when α=1.

In anticipation of the amount of input noise component, CPU 6 controls control parameter α, maintains the amount of output noise component at a certain level, and controls the directivity synthesis level (stereo separation effect level).

Figure 7:
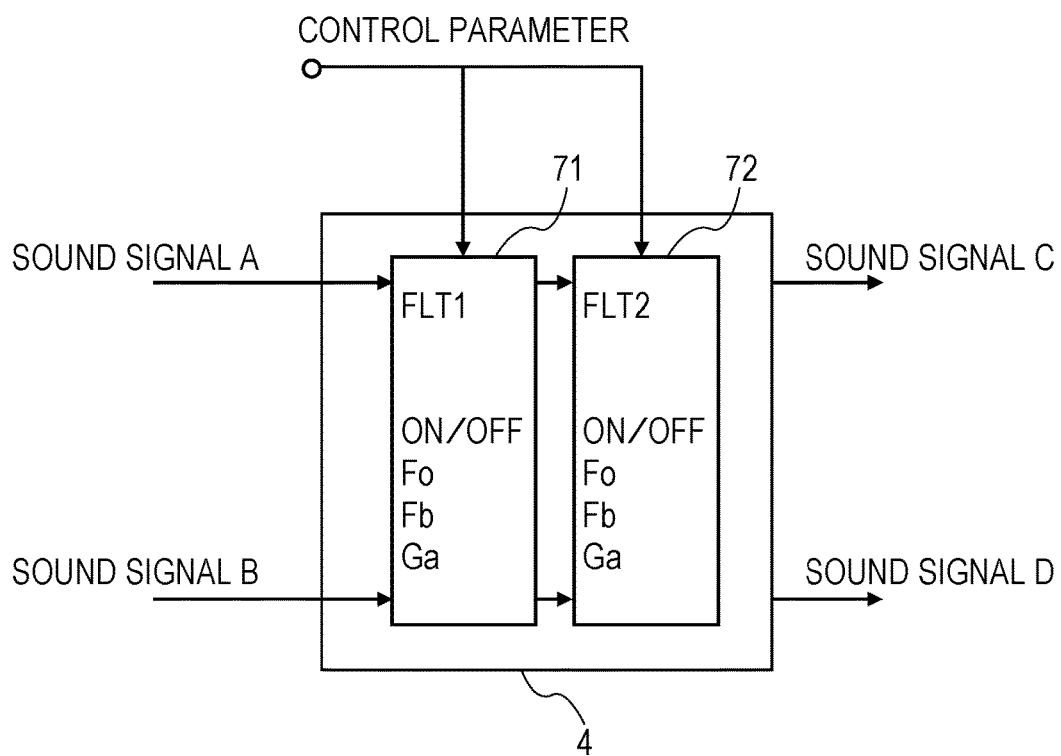
FIG. 7 is a diagram illustrating a configuration of a filter unit of the imaging apparatus according to the first exemplary embodiment.

FIG. 7 is a block diagram illustrating the operation of filter unit 4 illustrated in FIG. 1. A 2-ch sound signal is input from directivity synthesizer 3. Filter unit 4 includes digital filter modules (hereinafter referred to as "DFMs") 71, 72, each of which can adjust a filter characteristic according to a control parameter from CPU 6.

DFMs 71, 72 are notch filters, each of which can selectively switch between ON/OFF of the filter and can select and adjust mean frequency Fo, bandwidth Fb, and gain Ga of the filter. DFMs 71, 72 perform filter processing for the respective input 2-ch sound signals and output the signals.

Figure 8:
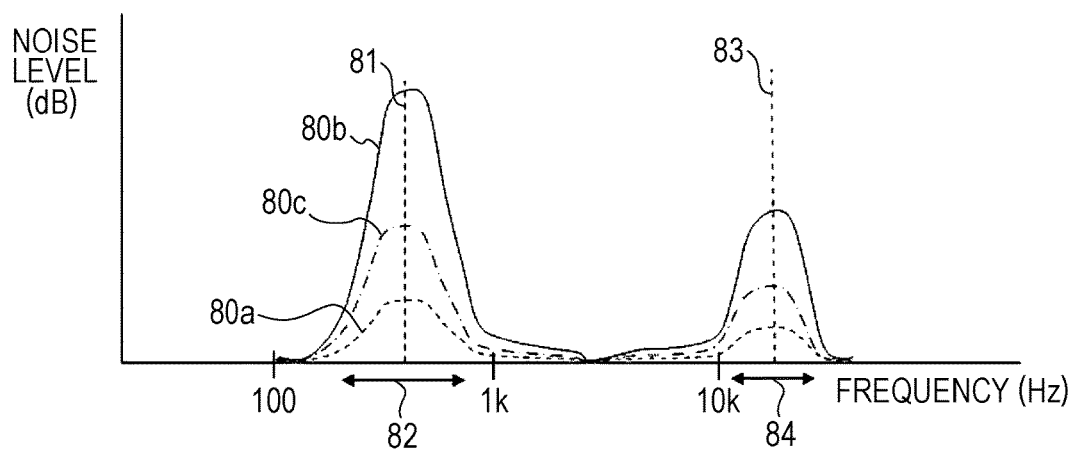
FIG. 8 is a diagram illustrating an operation of the filter unit of the imaging apparatus according to the first exemplary embodiment.

FIG. 8 illustrates noise frequency characteristics when an AF operation is performed by lens 7. As illustrated in FIG. 8, there are two signal peaks: mean frequency Fo=81 and bandwidth Fb=82; and mean frequency Fo=83 and bandwidth Fb=84. The noise level varies depending on the lens f-number. When the lens f-number is small, the noise level is represented by frequency characteristic 80a. When the lens f-number is large, the noise level is represented by frequency characteristic 80b. When the lens f-number is neither small nor large, the noise level is represented by characteristic 80c. Noise level comparison at the same frequency illustrates that the noise level is higher when the lens f-number is large than when the lens f-number is small.

Figure 9:
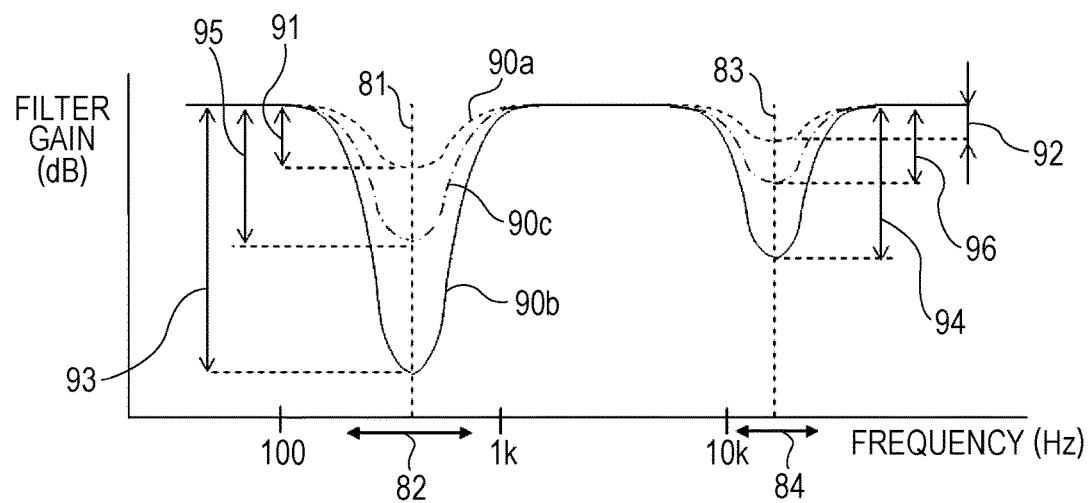
FIG. 9 is a diagram illustrating an operation of the filter unit of the imaging apparatus according to the first exemplary embodiment.

FIG. 9 is a diagram illustrating filter processing for reducing noise components generated during an AF operation. When the lens f-number is small, noise components can be reduced by filter processing using DFMs 71, 72 illustrated in FIG. 7. DFMs 71, 72 are notch filters (frequency characteristic 90a): one notch filter with a mean frequency Fo of 81, a bandwidth Fb of 82, and a gain Ga of 91; and the other notch filter with a mean frequency Fo of 83, a bandwidth Fb of 84, and a gain Ga of 92. When the lens f-number is large, noise components can be reduced by filter processing using notch filters (frequency characteristic 90b): one notch filter with a mean frequency Fo of 81, a bandwidth Fb of 82, and a gain Ga of 93; and the other notch filter with a mean frequency Fo of 83, a bandwidth Fb of 84, and a gain Ga of 94. When the lens f-number is neither small nor large, noise components can be reduced by filter processing using notch filters (frequency characteristic 90c): one notch filter with a mean frequency Fo of 81, a bandwidth Fb of 82, and a gain Ga of 95; and the other notch filter with a mean frequency Fo of 83, a bandwidth Fb of 84, and a gain Ga of 96.

As described in the foregoing, DFMs 71, 72 included in filter unit 4 reduce noise contained in an output signal of microphones 1, 2. The noise reduction level of DFM 71, 72 is controlled according to the lens f-number so that the aforesaid noise reduction level is increased when the lens f-number is large than when the lens f-number is small. Thereby, noise components generated during an AF operation can be effectively reduced. In the above-described example configuration, according to the lens f-number, the noise reduction level of DFMs 71, 72 is set to three values, but the noise reduction level can be appropriately set to a different number of values.

Data on filter sound processing for the aforementioned operations are stored in memory 12 illustrated in FIG. 1.

Figure 10:
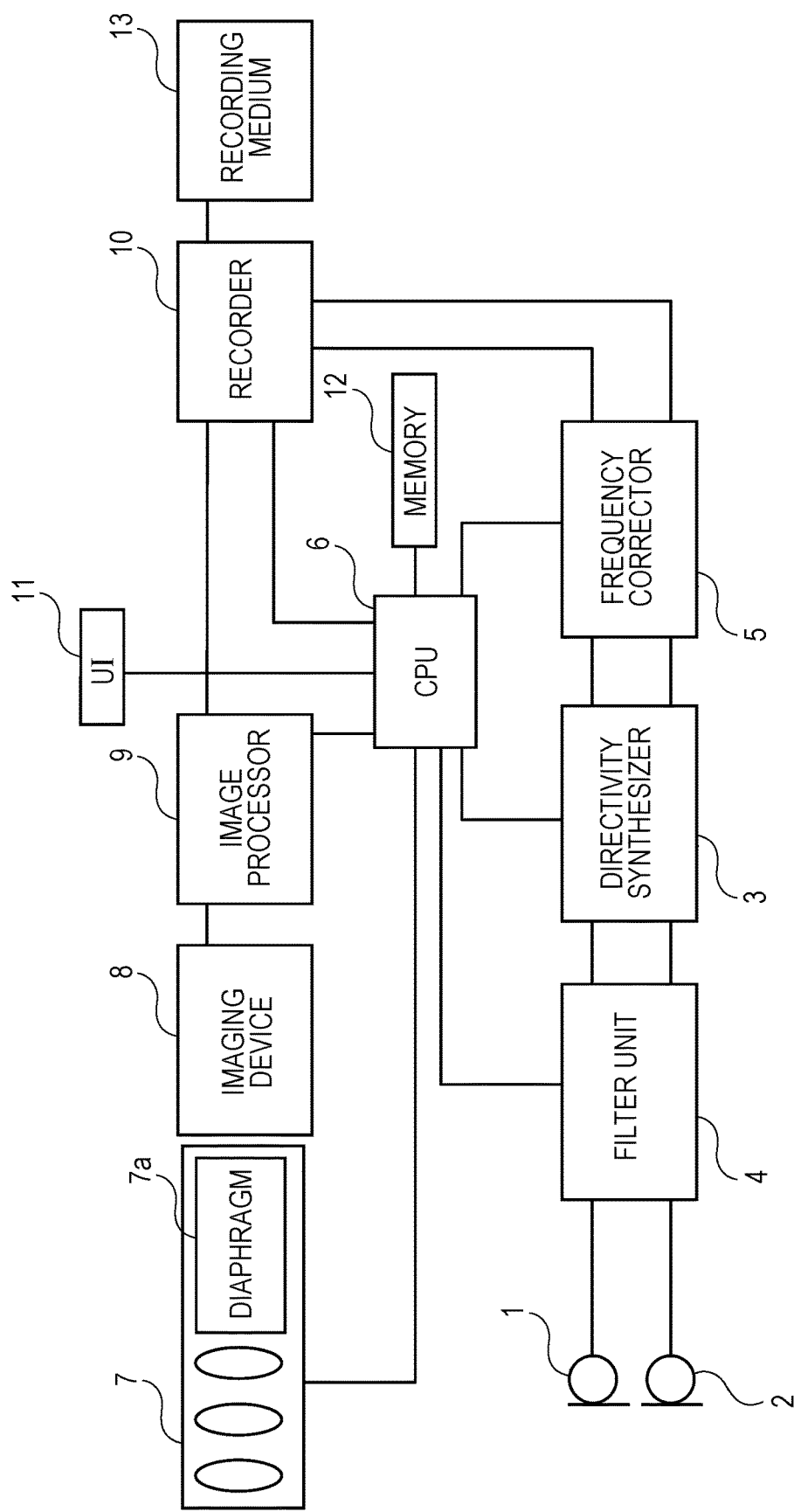
FIG. 10 is a diagram illustrating a configuration of a modified example of the imaging apparatus according to the first exemplary embodiment.

In this exemplary embodiment, DFMs 71, 72 are used for noise reduction. Depending on the type of generated noise component, a low pass filter, a high pass filter, or a notch filter of a different type may be used. In the configuration of FIG. 1, filter unit 4 is disposed between directivity synthesizer 3 and frequency corrector 5. As illustrated in FIG. 10, it is possible to adopt a configuration where a sound signal output from microphones 1, 2 is input into filter unit 4 and the output from filter unit 4 is input into directivity synthesizer 3.

Second Exemplary Embodiment

Figure 11:
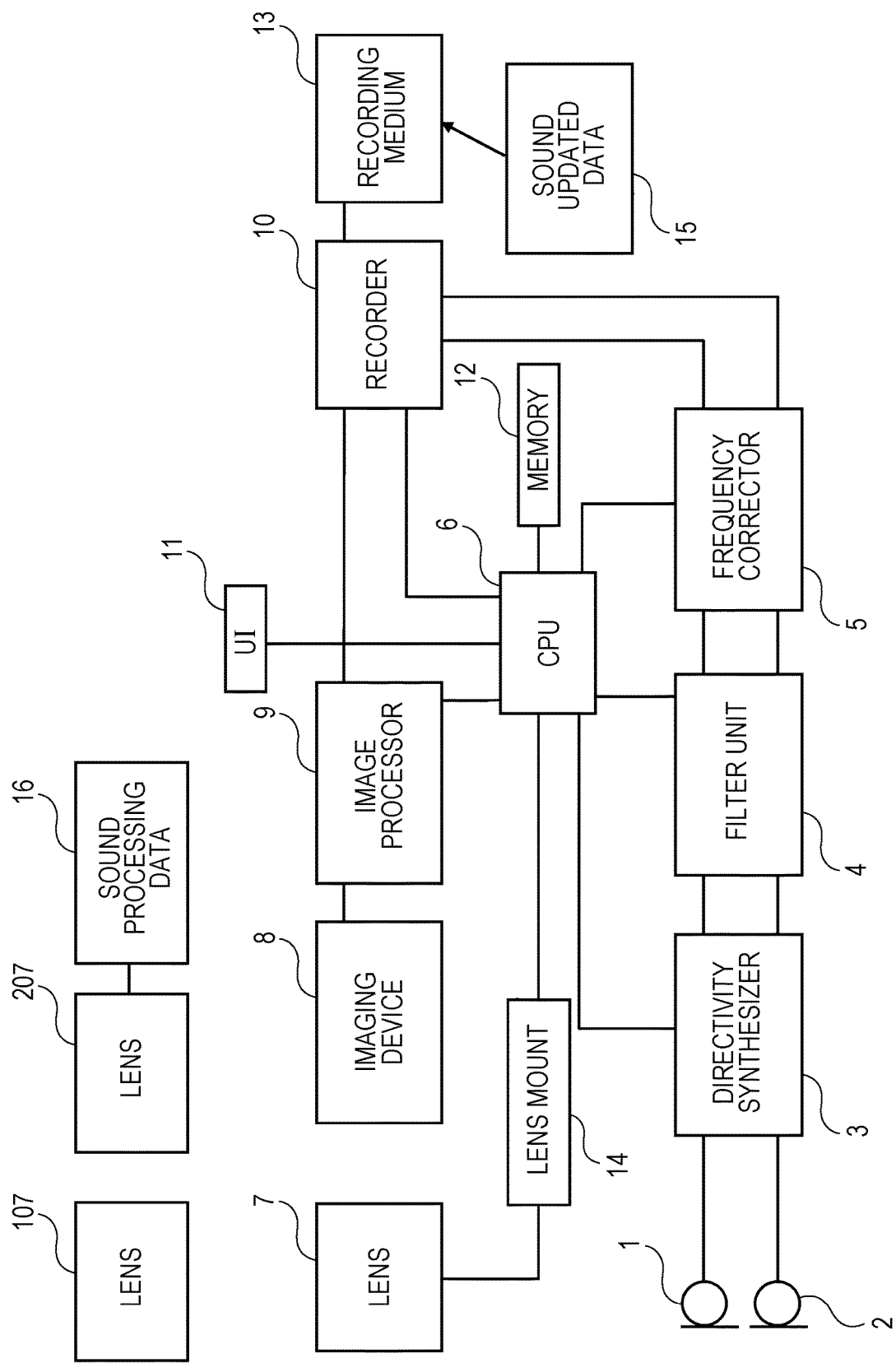
FIG. 11 is a diagram illustrating a configuration of an imaging apparatus according to a second exemplary embodiment.

With regard to first exemplary embodiment, an imaging apparatus of a lens-integrated type is described, but the imaging apparatus according to the present disclosure is not limited to the above-described type. FIG. 11 is a block diagram illustrating an operation of an imaging apparatus according to a second exemplary embodiment. There are components in FIG. 11 that are common with components of FIG. 1. The operations of the common components according to the second exemplary embodiment are identical to their operations in the first exemplary embodiment.

The imaging apparatus according to the second exemplary embodiment is designed as a lens interchangeable type. Using lens mount 14, the lens of the imaging apparatus can be exchanged with, e.g., lens 107 or lens 207. In the lens-interchangeable imaging apparatus, sound processing data stored in memory 12 can be updated. The updating procedure is performed by a user as follows: first of all, storing sound updated data 15 in recording medium 13 and inserting recording medium 13 into the imaging apparatus according to the second exemplary embodiment; via UI 11, comparing sound updated data 15 with sound processing data stored in memory 12; and instructing CPU 6 to update the data. The foregoing feature enables sound processing suitable for a lens that is developed after development of a main body of the imaging apparatus.

In addition to optical data, lens 207 stores sound processing data 16 specific to lens 207. When lens 207 is mounted via lens mount 14, by means of data communication, sound processing data 16 and the sound processing data stored in memory 12 are automatically compared and updated by CPU 6.

Such a configuration exempts a user from performing an updating operation and enables automatic sound processing suitable for a lens that is developed after development of a main body of the imaging apparatus.

The present disclosure is applicable to an imaging apparatus, such as a digital still camera or a digital video camera.

What is claimed is:
1. An imaging apparatus comprising:
 a lens;
 a microphone for recording sound; and
 a filter configured to reduce noise contained in an output signal of the microphone,
 wherein a noise reduction level of the filter is controlled according to an f-number of the lens such that the noise reduction level of the filter is increased more when the f-number of the lens is large than when the f-number of the lens is small.
2. The imaging apparatus according to claim 1, wherein the filter is configured to reduce noise generated when an autofocusing operation is performed.

* * * * *